US012764789B2

(12) United States Patent
Lin

(10) Patent No.: US 12,764,789 B2
(45) Date of Patent: Oct. 13, 2026

(54) APPARATUS AND METHOD OF WIRELESS COMMUNICATION

(71) Applicant: GUANGDONG OPPO MOBILE TELECOMMUNICATIONS CORP., LTD., Dongguan (CN)

(72) Inventor: Hao Lin, Neuilly-sur-Seine (FR)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 362 days.

(21) Appl. No.: 18/499,456

(22) Filed: Nov. 1, 2023

(65) Prior Publication Data

US 2024/0064812 A1 Feb. 22, 2024

Related U.S. Application Data

(63) Continuation of application No. PCT/IB2021/000362, filed on May 10, 2021.

(51) Int. Cl.
*H04W 74/0816* (2024.01)
*H04W 74/00* (2009.01)

(52) U.S. Cl.
CPC ..... *H04W 74/0816* (2013.01); *H04W 74/002* (2013.01)

(58) Field of Classification Search
CPC . H04L 27/2602; H04L 5/0023; H04L 5/0032; H04L 5/0044; H04L 5/0048; H04L 5/0053; H04L 5/0064; H04L 5/0082; H04L 5/0091; H04W 74/002; H04W 74/006; H04W 74/0816
See application file for complete search history.

(56) References Cited

U.S. PATENT DOCUMENTS

| | | | | |
|---|---|---|---|---|
| 2019/0124690 | A1* | 4/2019 | Siomina | H04W 24/10 |
| 2019/0327765 | A1* | 10/2019 | Mukherjee | H04W 16/14 |
| 2019/0387546 | A1* | 12/2019 | Li | H04W 74/0808 |
| 2020/0245354 | A1* | 7/2020 | Kazmi | H04W 76/15 |
| 2021/0185719 | A1* | 6/2021 | Xue | H04L 5/0032 |
| 2021/0321314 | A1* | 10/2021 | Ozturk | H04W 36/24 |

(Continued)

OTHER PUBLICATIONS

TR 38.808 Study on supporting NR from 52.6GHz to 71GHz Nov. 2020 Section 4 inspired our disclosure.

(Continued)

*Primary Examiner* — Kashif Siddiqui
(74) *Attorney, Agent, or Firm* — Ladas & Parry LLP

(57) ABSTRACT

An apparatus and a method of wireless communication are provided. The method by a user equipment (UE) includes being configured, by a base station, with a first parameter and/or a second parameter, wherein the first parameter comprises information relevant to a channel access procedure application for a first transmission, and/or the second parameter comprises information relevant to a channel access procedure application for a second transmission. This can solve issues in the prior art, provide a channel access relevant indication for more than one scheduled uplink transmission by a same downlink control indicator (DCI) in a shared spectrum, reduce signaling overhead, provide a good communication performance, and/or provide high reliability.

20 Claims, 2 Drawing Sheets

(56) References Cited

U.S. PATENT DOCUMENTS

2023/0072340 A1* 3/2023 El Hamss ......... H04W 74/0808
2023/0101279 A1* 3/2023 Niu ....................... H04L 5/0094
370/329

OTHER PUBLICATIONS

Ericsson : “Wideband operation for NR-U” , 3GPP Draft;R1-1912713,3RD Generation Partnership Project (3GPP) , Mobile Competence Centre; 650, Route Des Lucioles ; F-06921 Sophia Antipolis Cedex ; France , vo1. RAN WG1, no. Reno,Nv,USA; Nov. 18, 2019-Nov. 22, 2019 . Nov. 9, 2019 (Nov. 9, 2019), XP051823557, Retrieved from the Internet :URL : https : //ftp. 3gpp.org/tsg_ran/ WG1_RL1/TSGR1_99/Docs/R1-1912713.zip R1-1912713,wideband operation . docx . [retrieved on Nov. 9, 2019] sections 2.1-2.4.
Qualcomm Incorporated: “Enhancements to Scheduling and HARQ operation for NR-U”, 3GPP DRAFT;R1-1912940,3rd Generation Partnership Project ( 3GPP), Mobile Competence Centre; 650, Routedes Lucioles ; F-06921 Sophia Antipolis Cedex;France , vol. RAN WG1, no. Reno, Nevada, USA;Nov. 18, 2019-Nov. 22, 2019 , Nov. 9, 2019 (Nov. 9, 2019), XP051823703, Retrieved from the Internet : URL: https ://ftp. 3gpp.org/tsg_ran/WG1_RL1/TSGR1_99/Docs/R1-1912940 .zip R1-1912940.
Nokia et al: “on Active BWP switch delay in NR-U”,3GPP Draft;R4-1914180,3rd Generation Partnership Project ( 3GPP), Mobile Competencecentre; 650, Route Des Lucioles ; F 06921 Sophia Antipolis Cedex; France,vo1. RAN wG4, no. Reno, USA; Nov. 18, 2019-Nov. 22, 2019 . Nov. 8, 2019 (Nov. 8, 2019), XP051818618, Retrieved from the Internet : URL: https ://ftp .3gpp . org/tsg_ran/ WG4_Radio/TSGR4_93/Docs/R4-1914180 . zip R4-1914180 on Active BwP switch delay in NR-U. docx [retrieved on Nov. 8, 2019], sections 1,2.
Ericsson : “Remaining issues on Intra-UE prioritization and multi-plexing”, 3GPP Draft;R2-2002710,3rd Generationpartnership Proj-ect( 3GPP), Mobile Competence Centre;650,ROUTE Des Lucioles ; F-06921 Sophia-Antipolis Cedex;France,vo1. RAN WG2,no. Elec-tronic; Apr. 20, 2020-Apr. 30, 2020.Apr. 9, 2020 (Apr. 9, 2020) , XP051870130, Retrieved from the Internet : URL : https ://ftp. 3gpp.org/tsg_ran/ WG2_RL2/TSGR2_109bis-e/Docs/R2-2002710. zip,R2-2002710.
International Search Report and Written Opinion, International Application No. PCT/IB2021/000362, mailed Apr. 19, 2022 (25 pages).

* cited by examiner

APPARATUS AND METHOD OF WIRELESS COMMUNICATION

CROSS-REFERENCE TO RELATED APPLICATIONS

The present disclosure is a continuation of International Patent Application No. PCT/IB2021/000362, filed on May 10, 2021, the entire disclosures of which are incorporated herein by reference.

TECHNICAL FIELD

The present disclosure relates to the field of communication systems, and more particularly, to an apparatus and a method of wireless communication, which can provide a good communication performance and/or high reliability.

BACKGROUND

In an unlicensed band, an unlicensed spectrum is a shared spectrum. Communication equipment in different communication systems can use the unlicensed spectrum as long as the unlicensed meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum. For example, a communication device follows a listen before talk (LBT) or channel access procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT). LBT mechanism is also called a channel access procedure. In new radio (NR) Release 16, there are different types of channel access procedures, e.g., type 1, type 2A, type 2B and type 2C channel access procedures as described in TS 37.213.

In some regions, the channel access is not mandatory, thus a gNB may control whether or not the channel access procedure shall be applied according to the interference environment at gNB or at UE side.

Therefore, there is a need for an apparatus and a method of wireless communication, which can solve issues in the prior art, provide a method for channel access procedure indication, provide a good communication performance and/or high reliability.

SUMMARY OF THE DISCLOSURE

An object of the present disclosure is to propose an apparatus (such as a user equipment (UE) and/or a base station) and a method of wireless communication, which can solve issues in the prior art, provide a method for channel access procedure indication, provide a good communication performance and/or high reliability.

In a first aspect of the present disclosure, a method of wireless communication by a user equipment (UE) comprises being configured, by a base station, with a first parameter and/or a second parameter, wherein the first parameter comprises information relevant to a channel access procedure application for a first transmission, and/or the second parameter comprises information relevant to a channel access procedure application for a second transmission.

In a second aspect of the present disclosure, a method of wireless communication by a base station comprises configuring, to a user equipment (UE), a first parameter and/or a second parameter, wherein the first parameter comprises information relevant to a channel access procedure application for a first transmission, and/or the second parameter comprises information relevant to a channel access procedure application for a second transmission.

In a third aspect of the present disclosure, a user equipment comprises a memory, a transceiver, and a processor coupled to the memory and the transceiver. The processor is configured, by a base station, with a first parameter and/or a second parameter, wherein the first parameter comprises information relevant to a channel access procedure application for a first transmission, and/or the second parameter comprises information relevant to a channel access procedure application for a second transmission.

In a fourth aspect of the present disclosure, a base station comprises a memory, a transceiver, and a processor coupled to the memory and the transceiver. The processor is configured to configure, to a user equipment (UE), a first parameter and/or a second parameter, wherein the first parameter comprises information relevant to a channel access procedure application for a first transmission, and/or the second parameter comprises information relevant to a channel access procedure application for a second transmission.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF THE DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

For uplink transmissions or downlink transmissions in a shared spectrum, a user equipment (UE) or a gNB may perform a channel access procedure before transmitting one or more uplink transmissions or one or more downlink transmissions in a channel. The channel access procedure comprises sensing a channel to determine whether the channel is idle or busy. Optionally, a channel access procedure may comprise at least a type 1 channel access according to section 4.2.1.1 of TS37.213, or a type 2A channel access according to section 4.2.1.2.1 of TS37.213, or a type 2B channel access according to section 4.2.1.2.2 of TS37.213, or a type 2C channel access according to section 4.2.1.2.3 of TS37.213.

Figure 1:
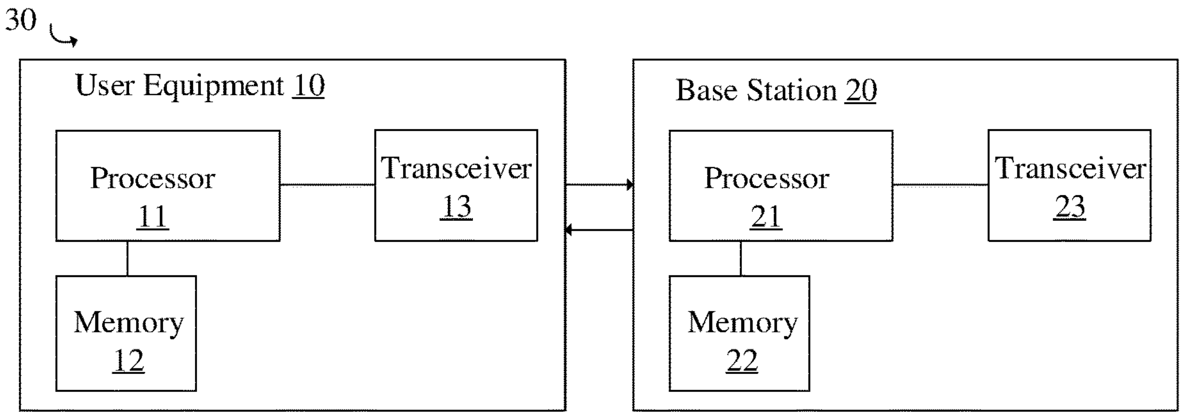
FIG. 1 is a block diagram of one or more user equipments (UEs) and a base station (e.g., gNB) of communication in a communication network system according to an embodiment of the present disclosure.

FIG. 1 illustrates that, in some embodiments, one or more user equipments (UEs) 10 and a base station (e.g., gNB) 20 for transmission adjustment in a communication network system 30 according to an embodiment of the present disclosure are provided. The communication network system 30 includes the one or more UEs 10 and the base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured, by the base station 20, with a first parameter and/or a second parameter, wherein the first parameter comprises information relevant to a channel access procedure application for a first transmission, and/or the second parameter comprises information relevant to a channel access procedure application for a second transmission. This can solve issues in the prior art, provide a method for channel access procedure indication, provide a good communication performance and/or high reliability.

In some embodiments, the processor 21 is configured to configure, to the user equipment (UE) 10, a first parameter and/or a second parameter, wherein the first parameter comprises information relevant to a channel access procedure application for a first transmission, and/or the second parameter comprises information relevant to a channel access procedure application for a second transmission. This can solve issues in the prior art, provide a method for channel access procedure indication, provide a good communication performance and/or high reliability.

Figure 2:
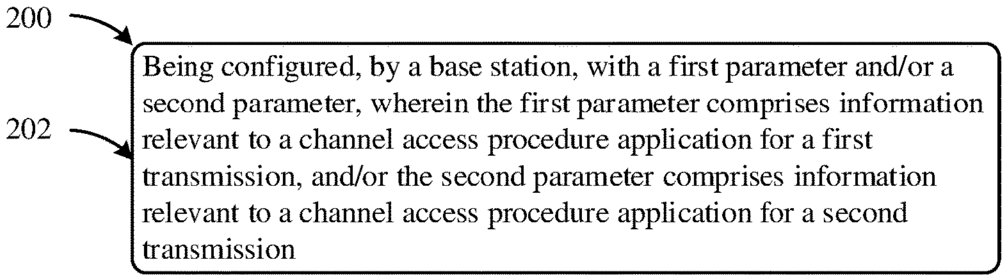
FIG. 2 is a flowchart illustrating a method of wireless communication performed by a user equipment (UE) according to an embodiment of the present disclosure.

FIG. 2 illustrates a method 200 of wireless communication by a user equipment (UE) according to an embodiment of the present disclosure. In some embodiments, the method 200 includes: a block 202, being configured, by a base station, with a first parameter and/or a second parameter, wherein the first parameter comprises information relevant to a channel access procedure application for a first transmission, and/or the second parameter comprises information relevant to a channel access procedure application for a second transmission. This can solve issues in the prior art, provide a method for channel access procedure indication, provide a good communication performance and/or high reliability.

Figure 3:
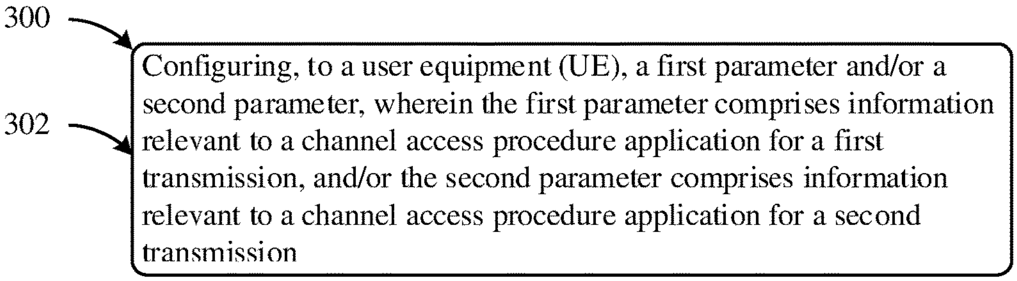
FIG. 3 is a flowchart illustrating a method of wireless communication performed by a base station according to an embodiment of the present disclosure.

FIG. 3 illustrates a method 300 of wireless communication by a base station according to an embodiment of the present disclosure. In some embodiments, the method 300 includes: a block 302, configuring, to a user equipment (UE), a first parameter and/or a second parameter, wherein the first parameter comprises information relevant to a channel access procedure application for a first transmission, and/or the second parameter comprises information relevant to a channel access procedure application for a second transmission. This can solve issues in the prior art, provide a method for channel access procedure indication, provide a good communication performance and/or high reliability.

In some embodiments, the first transmission comprises a downlink (DL) transmission, and/or the second transmission comprises an uplink (UL) transmission. In some embodiments, when the second parameter is absent, the first parameter is used for indication of the channel access procedure application for a second transmission. In some embodiments, the downlink transmission comprises at least one of the followings: a synchronization signal block (SSB), a physical downlink shared channel (PDSCH), a physical downlink control channel (PDCCH), a channel state information reference signal (CSI-RS), or a physical broadcast channel (PBCH). In some embodiments, the uplink transmission comprises at least one of the followings: a physical uplink sharing channel (PUSCH), a physical uplink control channel (PUCCH), a sounding reference signal (SRS), or a physical random access channel (PRACH). In some embodiments, the UE is configured to receive a first information from the base station, and the first information comprises the first parameter and/or the second parameter. In some embodiments, the first information comprises a system information. In some embodiments, the system information comprises at least one of the followings: a master information block (MIB) or a system information block (SIB) x, where x is an integer greater than or equal to 1. In some embodiments, the system information is transmitted in a PBCH or a first PDSCH.

In some embodiments, the first PDSCH is cyclic redundancy check (CRC) scrambled with system information radio network temporary identifier (SI-RNTI). In some embodiments, the method further comprises being configured, by the base station, with a third parameter and/or a fourth parameter, wherein the third parameter comprises information relevant to the channel access procedure application for the first transmission, and/or the fourth parameter comprises information relevant to the channel access procedure application for the second transmission. In some embodiments, the UE is configured to receive a second information from the base station, and the second information comprises the third parameter and/or the fourth parameter. In some embodiments, when the UE receives the third parameter and the first parameter, the UE uses the third parameter to determine the channel access procedure application for the first transmission. In some embodiments, when the UE receives the second parameter and the fourth parameter, the UE uses the fourth parameter to determine the channel access procedure application for the second transmission.

In some embodiments, when the third parameter is absent, the UE follows the first parameter to determine the channel access procedure application for the first transmission. In some embodiments, when the fourth parameter is absent, the UE follows the second parameter or the third parameter to determine the channel access procedure application for the second transmission. In some embodiments, the second information comprises at least one of the followings: a radio resource control (RRC) message or a media access control-control element (MAC-CE). In some embodiments, the RRC message and/or the MAC-CE is transmitted in a second PDSCH, where the second PDSCH is CRC scrambled with cell-RNTI (C-RNTI), modulation and coding scheme cell-RNTI (MCS-C-RNTI), or temporary cell-RNTI (TC-RNTI). In some embodiments, the UE receives a third information from the base station, and the third information comprises a fifth parameter. In some embodiments, the fifth parameter is used to determine the channel access procedure application for the first transmission and/or the second transmission. In some embodiments, the third information comprises a downlink control information (DCI).

In some embodiments, the DCI comprises at least one of the followings: a DCI format 2_0, a DCI format 0-1, a DCI format 1_1, a DCI format 1_2, a DCI format 0_0, a DCI format 1_0, or a DCI format 1_2. In some embodiments, determination from the third information, the second information, or the first information for the channel access procedure application for the first transmission and/or the second transmission is valid for a duration. In some embodiments, the duration is determined from the third information or the duration is pre-configured. In some embodiments, the information relevant to the channel access procedure application for the first transmission and/or the second transmission comprises at least one of the followings: performing a channel access procedure before performing the first transmission and/or the second transmission; or omitting the channel access procedure before performing the first transmission and/or the second transmission. In some embodiments, when the first parameter is present in the system information, a channel access procedure is applied before the first transmission, and/or when the first parameter is absent in the system information, the channel access procedure is not applied for the first transmission. In some embodiments, when the first parameter is present in the system information, a channel access procedure is not applied before the first transmission, and/or when the first parameter is absent in the system information, the channel access procedure is applied for the first transmission.

In some embodiments, the first parameter comprises a first indication and a second indication, the first indication is associated with a first SSB index and the second indication is associated with a second SSB index. In some embodiments, the first indication comprises a first bit, and the second indication comprises a second bit. In some embodiments, each of the first bit and the second bit comprises a first value and a second value, the first value corresponds to that the channel access procedure is one of applicable or not applicable for the first transmission, and the second value corresponds to that the channel access procedure is the other of applicable or not applicable for the first transmission. In some embodiments, the first indication is used to determine whether the channel access procedure is applied before a first DL transmission, and the first DL transmission is quasi co-located (QCL'ed) type D with an SSB with the first SSB index, and/or the second indication is used to determine whether the channel access procedure is applied before a second DL transmission, and the second DL transmission is QCL'ed type D with an SSB with the second SSB index. In some embodiments, when the second parameter is present in the system information, a channel access procedure is applied before the second transmission, and/or when the second parameter is absent in the system information, the channel access procedure is not applied for the second transmission.

In some embodiments, when the second parameter is present in the system information, a channel access procedure is not applied before the second transmission, and/or when the second parameter is absent in the system information, the channel access procedure is applied for the second transmission. In some embodiments, the second parameter comprises a third indication and a fourth indication, the third indication is associated with a third SSB index and the fourth indication is associated with a fourth SSB index. In some embodiments, the third indication comprises a third bit, and the fourth indication comprises a fourth bit. In some embodiments, each of the third bit and the fourth bit comprises a third value and a fourth value, the third value corresponds to that the channel access procedure is one of applicable or not applicable for the second transmission, and the fourth value corresponds to that the channel access procedure is the other of applicable or not applicable for the second transmission. In some embodiments, the third indication is used to determine whether the channel access procedure is applied before a first UL transmission, and the first UL transmission is quasi co-located (QCL'ed) type D with an SSB with the third SSB index, and/or the fourth indication is used to determine whether the channel access procedure is applied before a second UL transmission, and the second UL transmission is QCL'ed type D with an SSB with the fourth SSB index.

In some embodiments, the UE does not expect indications of the third parameter and the first parameter to be different. In some embodiments, the UE does not expect indications of the second parameter and the fourth parameter to be different. In some embodiments, the duration starts from a first location. In some embodiments, the first location is relevant to a slot in which the UE detects the DCI format 2_0; and/or the first location is a start of the slot, an end of the slot, an end of a last symbol of the PDCCH carrying the DCI format 2_0. In some embodiments, the duration is indicated in the DCI format 2_0, or the duration is derived from a DCI format 2_0 monitoring occasion. In some embodiments, the duration ends at a next DCI format 2_0 monitoring occasion.

In some regions, a channel access mechanism as known as a listen before talk (LBT) is not mandatory, but a network may still enable or disable the LBT for downlink and/or uplink transmissions according to an interference distribution. In some embodiments, a network provides by a first parameter to a UE with information relevant to an application of a channel access procedure for a first transmission and/or provides by a second parameter with information relevant to application of a channel access procedure for a second transmission, wherein the first transmission comprises a downlink transmission and the second transmission comprises an uplink transmission. This can solve issues in the prior art, provide a method for channel access procedure indication, provide a good communication performance and/or high reliability.

In some embodiments, when the second parameter is absent, the first parameter is used for indication of channel access procedure application for the second transmission. In some embodiments, the downlink transmission comprises at least one of the followings: SSB, PDSCH, PDCCH, CSI-RS, or PBCH. In some embodiments, the uplink transmission comprises at least one of the followings: PUSCH, PUCCH, SRS, or PRACH. In some embodiments, a UE receives a first information from the network, wherein the first information comprises the first parameter and/or the second parameter. In some embodiments, the first information comprises a system information. In some embodiments, the system information comprises at least one of the followings: MIB or SIB x, where x is an integer greater than or equal to 1.

In some embodiments, the network provides by a third parameter with information with an information relevant to an application of a channel access procedure for the first transmission and/or provides by a fourth parameter with information with information relevant to an application of a channel access procedure for the second transmission. In some embodiments, a UE receives a second information from the network, wherein the second information comprises the third parameter and/or the fourth parameter. In some embodiments, when the UE receives the third parameter and the first parameter, the UE uses the third parameter to determine the channel access procedure application for the first transmission. In some embodiments, when the UE receives the second parameter and the fourth parameter, the UE uses the fourth parameter to determine the channel access procedure application for the second transmission. In some embodiments, when the third parameter is absent, the UE follows the first parameter to determine the channel access procedure application for the first transmission. In some embodiments, when the fourth parameter is absent, the UE follows the second parameter or the third parameter to determine the channel access procedure application for the second transmission. In some embodiments, the second information comprises at least one of the followings: a RRC message or a MAC-CE.

In some embodiments, the UE receives a third information from the network, wherein the third information comprises a fifth parameter. In some embodiments, the fifth parameter is used to determine the application of channel access procedure for the first transmission and/or the second transmission. In some embodiments, the third information comprises a DCI. In some embodiments, the DCI comprises at least one of the following: DCI format 2_0, DCI format 0_1, DCI format 1_1, DCI format 1_2, DCI format 0_0, DCI format 1_0, DCI format 1_2. In some embodiments, the determination from the third information or the second information or the first information for the application of channel access procedure for the first transmission and/or the second transmission is valid for a duration. In some embodiments, the duration is determined from the third information. In some embodiments, the duration is pre-configured. In some embodiments, the information relevant to the application of the channel access procedure for the first transmission and/or the second transmission comprises at least one of the followings: performing channel access procedure before performing the first transmission and/or the second transmission or omitting channel access procedure before performing the first transmission and/or the second transmission.

Further, towards higher carrier frequency above 52.6 GHz, due to the severe pass loss, the classical omni-directional transmission will suffer significant coverage limitation. A straightforward solution is to use beam-formed transmission, so that transmission energy can be more focused on the destination, resulting in an increased receive SNR. Similarly, for unlicensed band above 52.6 GHz, e.g. 60 GHz band, beamformed transmission will be used. On the other hand, channel access procedure (or LBT) is still suggested by the regulation. In this case, the legacy channel access procedure may not be suitable for higher frequency due to the fact that the legacy channel access mechanism does not consider beam-forming feature. In some embodiments of this disclosure, some examples present a new design for channel access mechanism over higher frequency, in which beam-forming technique is considered.

EXAMPLE

A UE receives a system information from a gNB, the system information is SIB1 and it contains a first parameter. The first parameter indicates whether channel access procedure is applied before a DL transmission. In some examples, when the parameter is present in the system information, it means that the channel access procedure is applied before the DL transmission. When the parameter is absent in the system information, it means that the channel access procedure is not applied for the DL transmission. Optionally, when the parameter is present in the system information, it means that the channel access procedure is not applied before the DL transmission. When the parameter is absent in the system information, it means that the channel access procedure is applied for the DL transmission. Optionally, [0033] In some embodiments, the first parameter comprises a first indication and a second indication, the first indication is associated with a first SSB index and the second indication is associated with a second SSB index. In some embodiments, the first indication comprises a first bit, and the second indication comprises a second bit. In some embodiments, each of the first bit and the second bit comprises a first value and a second value, the first value corresponds to that the channel access procedure is one of applicable or not applicable for the first transmission, and the second value corresponds to that the channel access procedure is the other of applicable or not applicable for the first transmission. In some embodiments, the first indication is used to determine whether the channel access procedure is applied before a first DL transmission, and the first DL transmission is quasi co-located (QCL'ed) type D with an SSB with the first SSB index, and/or the second indication is used to determine whether the channel access procedure is applied before a second DL transmission, and the second DL transmission is QCL'ed type D with an SSB with the second SSB index.

In some examples, the system information contains a second parameter. The second parameter indicates whether the UE shall apply channel access procedure before an UL transmission. In some examples, when the parameter is present in the system information, it means that the channel access procedure is applied before the UL transmission. When the parameter is absent in the system information, it means that the channel access procedure is not applied for the UL transmission. Optionally, when the parameter is present in the system information, it means that the channel access procedure is not applied before the UL transmission. When the parameter is absent in the system information, it means that the channel access procedure is applied for the UL transmission.

Optionally, when the second parameter is present in the system information, a channel access procedure is not applied before the second transmission, and/or when the second parameter is absent in the system information, the channel access procedure is applied for the second transmission. In some embodiments, the second parameter comprises a third indication and a fourth indication, the third indication is associated with a third SSB index and the fourth indication is associated with a fourth SSB index. In some embodiments, the third indication comprises a third bit, and the fourth indication comprises a fourth bit. In some embodiments, each of the third bit and the fourth bit comprises a third value and a fourth value, the third value corresponds to that the channel access procedure is one of applicable or not applicable for the second transmission, and the fourth value corresponds to that the channel access procedure is the other of applicable or not applicable for the second transmission. In some embodiments, the third indication is used to determine whether the channel access procedure is applied before a first UL transmission, and the first UL transmission is quasi co-located (QCL'ed) type D with an SSB with the third SSB index, and/or the fourth indication is used to determine whether the channel access procedure is applied before a second UL transmission, and the second UL transmission is QCL'ed type D with an SSB with the fourth SSB index.

In some examples, the UE receives a RRC configuration, where the RRC configuration contains a third parameter. The third parameter is used to determine whether the channel access procedure is applied for the DL transmission. In some examples, when the first parameter in the system information and the third parameter in the RRC configuration indicate different result, for instance, the first parameter indicates no channel access procedure is applied and the third parameter indicates channel access procedure is applied, the UE follows the third parameter indication. Optionally, the UE does not expect indications of the third parameter and the first parameter to be different.

In some examples, the UE receives a RRC configuration, where the RRC configuration contains a fourth parameter. The fourth parameter is used to determine whether the channel access procedure is applied for the UL transmission. In some examples, when the second parameter in the system information and the fourth parameter in the RRC configuration indicate different result, for instance, the second parameter indicates no channel access procedure is applied and the fourth parameter indicates channel access procedure is applied, the UE follows the fourth parameter indication. Optionally, the UE does not expect indications of the second parameter and the fourth parameter to be different.

In some examples, the UE may receive a fifth parameter in a DCI from the gNB. The DCI may be a DCI scheduling a DL transmission or an UL transmission. The fifth parameter is used to indicate the UE whether the UE needs to perform channel access procedure before the scheduled UL transmission when the DCI is scheduling an UL transmission. In some examples, the UL transmission includes at least one of the followings: PUCCH, SRS, PRACH, or PUSCH. In some examples, the fifth parameter is used to indicate the UE about whether the gNB has performed channel access procedure for a DL transmission when the DCI is scheduling the DL transmission. In some examples, the fifth parameter is used to indicate whether the UE shall perform or omit the channel access procedure for the UL transmission within a duration. In this example, the fifth parameter is in DCI format 2_0. The duration starts from a first location. The first location is relevant to the slot in which the UE detects the DCI format 2_0. For instance, the first location is the start of the slot, or end of the slot, or end of the last symbol of the PDCCH carrying the DCI format 2_0. In some examples, the duration is indicated in the DCI format 2_0. Optionally, the duration is derived from the DCI format 2_0 monitoring occasion. For instance, the duration ends at the next DCI format 2_0 monitoring occasion. The duration is pre-configured and pre-defined.

Commercial interests for some embodiments are as follows. 1. Solving issues in the prior art. 2. Providing a method for channel access procedure indication. 3. Providing a good communication performance. 4. Providing a high reliability. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 4:
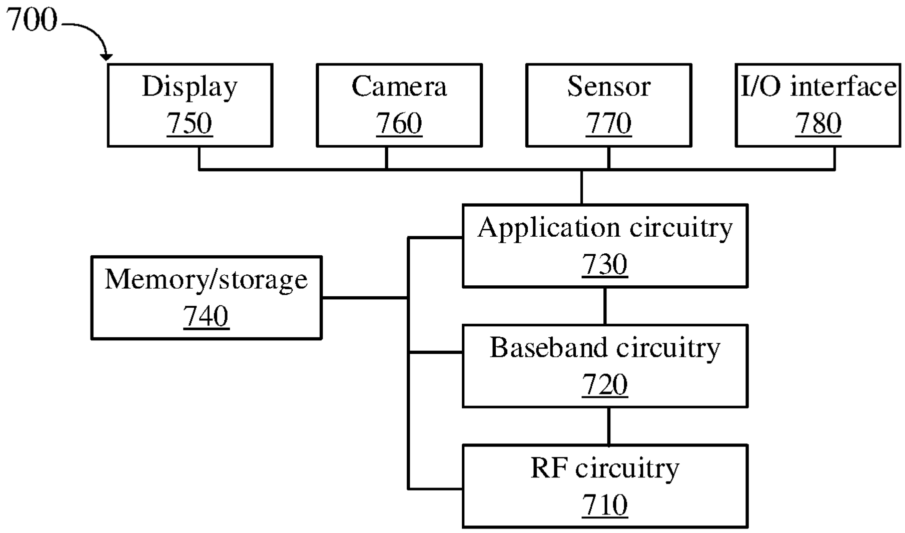
FIG. 4 is a block diagram of a system for wireless communication according to an embodiment of the present disclosure.

FIG. 4 is a block diagram of an example system 700 for wireless communication according to an embodiment of the present disclosure. Embodiments described herein may be implemented into the system using any suitably configured hardware and/or software. FIG. 4 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms. The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method by a user equipment (UE), comprising:

being configured, by a base station, with a first parameter and/or a second parameter, wherein the first parameter comprises information relevant to a channel access procedure application for a first transmission, and/or the second parameter comprises information relevant to a channel access procedure application for a second transmission;

wherein the information relevant to the channel access procedure application for the first transmission and/or the second transmission comprises:

omitting a channel access procedure before performing the first transmission and/or the second transmission;

wherein when the second parameter is absent, the first parameter is used for indication of the channel access procedure application for the second transmission;

wherein the UE is configured to receive first information from the base station, the first information comprises the first parameter and/or the second parameter, and the first information further comprises system information, and the system information comprises a master information block (MIB);

wherein when the first parameter is present in the system information, the channel access procedure is not applied before the first transmission, and when the first parameter is absent in the system information, the channel access procedure is applied for the first transmission.

2. The method of claim 1, wherein the first transmission comprises a downlink (DL) transmission, and/or the second transmission comprises an uplink (UL) transmission.

3. The method of claim 1, wherein the system information further comprises a system information block (SIB) x, where x is an integer greater than or equal to 1.

4. The method of claim 1, further comprising being configured, by the base station, with a third parameter and/or a fourth parameter, wherein the third parameter comprises information relevant to the channel access procedure application for the first transmission, and/or the fourth parameter comprises information relevant to the channel access procedure application for the second transmission.

5. The method of claim 4, wherein the UE is configured to receive a second information from the base station, and the second information comprises the third parameter and/or the fourth parameter.

6. The method of claim 4, wherein when the UE receives the third parameter and the first parameter, the UE uses the third parameter to determine the channel access procedure application for the first transmission; when the UE receives the second parameter and the fourth parameter, the UE uses the fourth parameter to determine the channel access procedure application for the second transmission.

7. The method of claim 4, wherein when the third parameter is absent, the UE follows the first parameter to determine the channel access procedure application for the first transmission; when the fourth parameter is absent, the UE follows the second parameter or the third parameter to determine the channel access procedure application for the second transmission.

8. The method of claim 4, wherein the UE receives a third information from the base station, and the third information comprises a fifth parameter; the fifth parameter is used to determine the channel access procedure application for the first transmission and/or the second transmission.

9. The method of claim 8, wherein determination from the third information, the second information, or the first information for the channel access procedure application for the first transmission and/or the second transmission is valid for a duration; the duration is determined from the third information or the duration is pre-configured.

10. The method of claim 3, wherein the first parameter comprises a first indication and a second indication, the first indication is associated with a first SSB index and the second indication is associated with a second SSB index.

11. The method of claim 3, wherein when the second parameter is present in the system information, a channel access procedure is applied before the second transmission, and/or when the second parameter is absent in the system information, the channel access procedure is not applied for the second transmission.

12. The method of claim 3, wherein when the second parameter is present in the system information, a channel access procedure is not applied before the second transmission, and/or when the second parameter is absent in the system information, the channel access procedure is applied for the second transmission.

13. The method of claim 3, wherein the second parameter comprises a third indication and a fourth indication, the third indication is associated with a third SSB index and the fourth indication is associated with a fourth SSB index.

14. A wireless communication method by a base station, comprising:

configuring, to a user equipment (UE), a first parameter and/or a second parameter, wherein the first parameter comprises information relevant to a channel access procedure application for a first transmission, and/or the second parameter comprises information relevant to a channel access procedure application for a second transmission;

wherein the information relevant to the channel access procedure application for the first transmission and/or the second transmission comprises:

omitting a channel access procedure before performing the first transmission and/or the second transmission;

wherein when the second parameter is absent, the first parameter is used for indication of the channel access procedure application for the second transmission;

wherein the base station is configured to transmit first information to the UE, the first information comprises the first parameter and/or the second parameter, and the first information further comprises system information, and the system information comprises a master information block (MIB);

wherein when the first parameter is present in the system information, the channel access procedure is not applied before the first transmission, and when the first parameter is absent in the system information the channel access procedure is applied for the first transmission.

15. A chip, comprising:

a processor, configured to call and run a computer program stored in a memory, to cause a device in which the chip is installed to execute:

being configured, by a base station, with a first parameter and/or a second parameter, wherein the first parameter comprises information relevant to a channel access procedure application for a first transmission, and/or the second parameter comprises information relevant to a channel access procedure application for a second transmission;

wherein the information relevant to the channel access procedure application for the first transmission and/or the second transmission comprises:

omitting a channel access procedure before performing the first transmission and/or the second transmission;

wherein when the second parameter is absent, the first parameter is used for indication of the channel access procedure application for the second transmission;

wherein the device is configured to receive first information from the base station, the first information comprises the first parameter and/or the second parameter and the first information further comprises system information, and the system information comprises a master information block (MIB);

wherein when the first parameter is present in the system information, the channel access procedure is not applied before the first transmission and when the first parameter is absent in the system information, the channel access procedure is applied for the first transmission.

16. The method of claim 14, further comprising configuring, to the UE, a third parameter and/or a fourth parameter, wherein the third parameter comprises information relevant to the channel access procedure application for the first transmission, and/or the fourth parameter comprises information relevant to the channel access procedure application for the second transmission.

17. The chip according to claim 15, the device further executes:

being configured, by the base station, with a third parameter and/or a fourth parameter, wherein the third parameter comprises information relevant to the channel access procedure application for the first transmission, and/or the fourth parameter comprises information relevant to the channel access procedure application for the second transmission.

18. The method of claim 14, wherein the first transmission comprises a downlink (DL) transmission, and/or the second transmission comprises an uplink (UL) transmission.

19. The method of claim 14, wherein the system information further comprises a system information block (SIB) x, where x is an integer greater than or equal to 1.

20. The chip of claim 15, wherein the first transmission comprises a downlink (DL) transmission, and/or the second transmission comprises an uplink (UL) transmission.

* * * * *